2,900,323

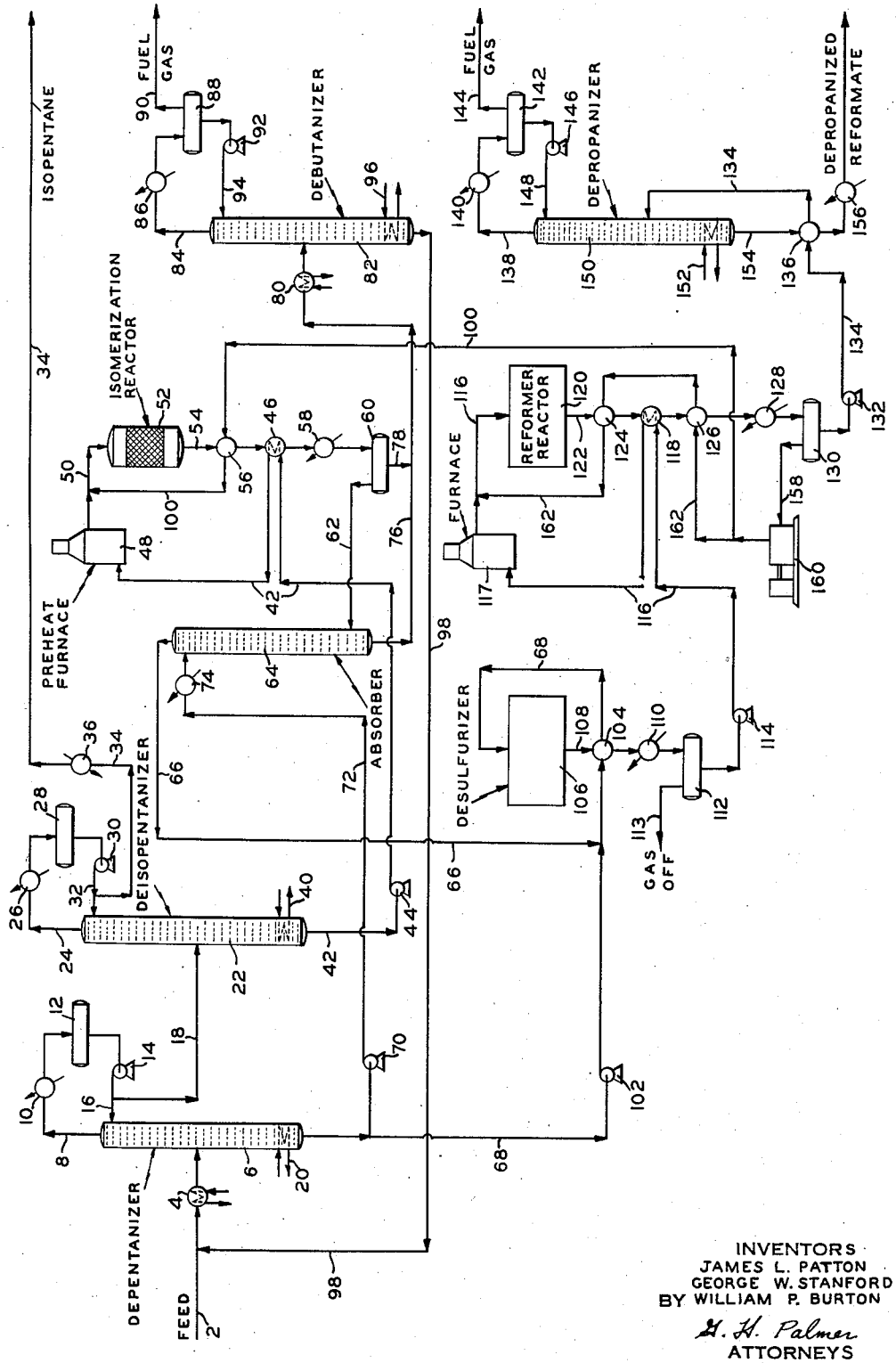

UPGRADING OF A NAPHTHA WITH THE RECYCLING OF THE HYDROGEN PRODUCED IN THE REFORMING STAGE

James L. Patton, Ramsey, George W. Stanford, Linden, and William P. Burton, Little Silver, N.J., assignors to The M. W. Kellogg Company, Jersey City, N.J., a corporation of Delaware Application November 26, 1954, Serial No. 471,253

10 Claims. (Cl. 208—63)

This invention relates to a combination process for the reforming and isomerization of hydrocarbons. More particularly, it relates to a combination catalytic reforming and catalytic isomerization process in which the reactions are carried out in the presence of hydrogen.

The process of catalytic reforming in the presence of hydrogen has found wide acceptance as a means of converting low octane hydrocarbon fractions boiling in the gasoline and naphtha range to hydrocarbon mixtures having a high octane rating. The reactions which provide this transformation are not completely understood but are generally believed to include hydrocracking, aromatization, cracking, isomerization, cyclization, dehydrogenation, hydrogenation and others. Depending on the type of catalyst used and its method of preparation, one or more of these reactions may be emphasized in relation to the other reactions. Of those listed, isomerization, dehydrogenation and hydrocracking are among the principal reactions.

The usual reforming feed material comprises a mixture of varied and complex hydrocarbons including paraffins, isoparaffins, olefins, diolefins, cyclic compounds, both saturated and unsaturated and compounds containing various inorganic constituents and having a wide range of molecular weight and varying structural configuration. When these compounds are contacted with a catalyst in a reforming reaction zone the reactions which take place strongly indicate a varied susceptibility of the different compounds to catalytic action, temperature and pressure; in a sense the reforming reactions appear to compete with each other. It is difficult when treating the usual complex feed mixture to control the degree of any individual reaction or reactions to provide a specific product distribution. The impossibility of establishing operating conditions which provide an optimum conversion of each compound in the reforming feed makes it necessary to carry out the conventional reforming process under conditions which provide instead the best average or overall conversion of the feed components to give a high octane product.

It is an object of this invention to provide an improved process for the conversion of hydrocarbons to hydrocarbons having a higher octane rating.

It is another object of this invention to provide a method of increasing the octane rating of hydrocarbons subjected to catalytic reforming.

It is still another object of this invention to provide a combination process for the catalytic isomerization and catalytic reforming of hydrocarbons.

Yet another object of this invention is to provide a new and improved method of isomerizing paraffin hydrocarbons present in a catalytic reforming feed.

In the method of this invention a stream rich in straight-chain paraffins of not more than six carbon atoms is separated from a reforming feed and is isomerized in the presence of hydrogen and an isomerization catalyst under conditions suitable to produce a high yield of isoparaffins. The reaction zone effluent is fractionated, unconverted paraffins are recycled to the reaction zone and heavier compounds in the effluent, having more than six carbon atoms are combined with the remainder of the reforming feed for passage through a conventional catalytic reformer. Hydrogen for use in the isomerization reaction zone is obtained from the reformer. When a desulfurization step is included prior to the reformer the hydrogen from the isomerization zone is further used in effecting the removal of sulfur.

As mentioned before, certain reactions predominate in the catalytic reforming of low boiling hydrocarbon fractions. For example, hydrocracking occurs extensively, with the formation of lower boiling hydrocarbons and a consumption of hydrogen. Aromatization also is an important reaction and it proceeds along two general paths, which include:

(1) Dehydrogenation of naphthenes and
(2) Cyclization of paraffins followed by dehydrogenation, both of which produce hydrogen.

Another important reaction takes place with the isomerization of paraffins, both straight-chain and cyclic. In addition to these, other reactions occur in varying degrees depending on the catalyst being used and the reaction conditions. Since all of the reactions which go to make up the reforming process compete with one another in their effort to transform the compounds present in the hydrocarbon feed, it is necessary to find a method of controlling as far as possible the type of products formed. It is possible to obtain a certain degree of selectivity by varying catalyst composition and the methods of catalyst preparation. Unfortunately, however, the type of product obtained by reforming is always controlled to a certain extent by the composition of the feed, immaterial of the catalyst used. This is particularly true with respect to the isomerization of straight-chain paraffins, for example, normal pentane.

The isomerization of normal pentane to isopentane is both a rate and an equilibrium reaction, that is, the degree of conversion to isopentane is controlled not only by the temperature and pressure and other conditions maintained in the reaction zone but also by the composition of the reactants. For example, when isomerizing normal pentane at a temperature of about 800° F., a pressure of about 800 p.s.i.g. and a weight space velocity of about 4 pounds of hydrocarbon per hour per pound of catalyst in the presence of a platinum catalyst, the equilibrium ratio of isopentane to normal pentane in the reaction product is about 2 mols per mol. Thus every 100 mols of reaction product contains a maximum of 66.6 mols of isopentane. This condition prevails immaterial of the composition of the feed material prior to the isomerization reaction. If the reactants are proportioned in a ratio of 2 mols of isopentane to 1 mol of normal pentane then under the conditions cited above no further conversion occurs. If, on the other hand, the reactant ratio is less than this, isopentane is formed up to the maximum set by the equilibrium ratio and if the ratio of isopentane to normal pentane in the reactants is greater than 2:1, the amount of isopentane in the reaction product decreases under the aforementioned reaction conditions to a ratio of about 2:1.

Inasmuch as the usual catalytic reformer feed contains both normal and isopentane it is obvious that the degree of isomerization of normal pentane in any reforming process is affected adversely by equilibrium considerations. In addition, the conditions of temperature, pressure space velocity, etc., under which reforming takes place are not necessarily those conditions which produce an optimum yield of isomers. Furthermore, the presence of other higher boiling compounds in the reformer feed also affects the degree of isomerization of normal pentane. These represent inherent deficiencies in the present methods of reforming which are overcome in the application of this invention.

Although the above discussion has been directed to the conversion of normal pentane, the same considerations hold true with respect to other normal paraffin compounds, e.g. butane and hexane, and mixtures of paraffin compounds.

In general, hydrocarbons suitable for reforming are naphthenes and paraffins which are present in straight run gasoline, natural gasoline, thermally and catalytically cracked gasolines and petroleum naphthas. The gasoline may be a full boiling range material having an initial ASTM boiling point between about 50 and about 100° F. and an end point between about 325 and about 450° F., or it may be a narrower fraction selected from within this boiling range. If it is preferred to use a naphtha as a reforming feed material the initial boiling point is generally between about 125 and about 250° F. with an end point between about 350 and about 425° F. Narrow naphtha fractions lying within this boiling range are also effectively reformed.

One group of catalysts used in the reforming operation comprises platinum or palladium composited with a cracking component. The percentage of the metal in the catalyst usually is between about 0.01 and about 10% by weight and more preferably, between about 0.05 and about 1.5%. The cracking component comprises any suitable cracking catalyst either natural or synthetic including acid treated clays and synthetic catalysts such as silica, alumina, silica-alumina, silica-zirconia, silica-magnesia, silica-thoria, silica-vanadia, silica-alumina-zirconia, silica-alumina-magnesia, etc. Another group of catalysts also useful in promoting the reforming reactions are those listed above and containing a combined halogen, for example, fluorine or chlorine, in a quantity between about 0.1 and about 8% by weight. Still another group of catalysts comprises the oxides of elements of group VI-B, for example chromium, molybdenum or tungsten, supported preferably on alumina but also on magnesia, natural clays, crushed firebrick, crushed silica, etc. In general the chromium, molybdenum or tungsten comprises only a small portion of the total catalyst mass, more usually between about 1 and about 10 weight percent. Yet another group of catalysts comprises heteropoly acids having at least one central acid group selected from the oxides or sulfides of elements of groups V-A and VI-A and outer acid groups in the ratio of about 3–12 to 1 selected from the oxides of elements of groups V-B and VI-B, such as molybdenum acid iodate, phosphomolybdic acid, silico tungstic acid, etc.

These and other conventional solid reforming catalysts are used within the scope of this invention.

The above catalysts may be prepared by any of the conventional methods well-known in the art. For example, platinum-silica-alumina catalyst is prepared in one instance by mixing dry silica-alumina gel with a platinum salt and calcining at an elevated temperature. If a halogen substituted catalyst is desired the halogen usually in the form of an acid may be added to the silica-alumina gel and platinum salt prior to calcining. When a chromia-alumina catalyst is desired, it is prepared by one method by depositing chromium nitrate on alumina by evaporation with subsequent igniting to form the oxide, etc.

Other paraffin hydrocarbons beside normal pentane are successfully isomerized by the method of this invention including normal butane, normal hexane and higher boiling compounds. Equilibrium and rate conditions of the various reactions are such as to make both the normal pentane and normal hexane reactions particularly attractive. The reactions of normal butane are not important in this instance since the usual reformer feed contains little material boiling below the pentanes. Isomerization of compounds above hexane is often attended with rather low yields and numerous side reactions which may result in a substantial destruction of the feed to low boiling hydrocarbons. In addition, the fraction of the conventional reforming feed boiling above hexane contains cyclic compounds which are desirable as reforming components. In view of the above it is contemplated to utilize an isomerization feed containing either pentanes or hexanes or mixtures thereof. Pentane has been arbitrarily selected as the feed material to be discussed herein partly because of its ease of separation from the reforming feed. Also, the use of a single component feed provides a clear picture of the results of the isomerization step, which might not be possible with a mixed feed. It is within the scope of the invention to isomerize a feed comprising the normal paraffin and isoparaffin in varying proportions but for the reasons previously given with reference to equilibrium considerations, it is preferable to isomerize a relatively pure normal paraffin material.

Platinum and palladium reforming catalysts of the type previously described become deactivated rather rapidly when contaminated with carbonaceous material. Although some of the current reforming processes are spoken of as being non-regenerative, in any reforming process some carbonaceous material is produced and deposited on the catalyst and it is only a question of time before it becomes necessary to discard the catalyst or to reactivate it by removing this material. Unfortunately, with many of the platinum catalysts regeneration does not provide a catalyst having an activity equal to the original uncontaminated catalyst and the catalyst becomes partially permanently deactivated. Since, in most cases, the permanent decrease in catalyst activity is progressive the catalyst after repeated regenerations eventually becomes permanently deactivated and undesirable for reforming purposes.

The foregoing also holds true for the chromium, molybdenum and tungsten catalysts and the heteropoly acids. These particular catalysts are more rugged and do not lose their activity so fast on being regenerated as do the platinum and palladium catalysts, however, this advantage is offset by the fact that normal operating conditions when using these catalysts are such that contamination occurs more rapidly and frequent regeneration is included as an integral part of the process. In spite of this, catalyst activity remains relatively high over a long period of time and the life of these catalysts compares favorably with the platinum and palladium catalysts.

As commonly used in the cracking art, catalyst activity may be defined as the mols of feed reacted per 100 mols of feed contacted with the catalyst. To compare different catalysts or similar catalysts having different activities the term "relative activity" is frequently used, this being the activity of any catalyst or catalysts compared with a base catalyst.

For example, if a fresh unused chromia-alumina catalyst when contacted with a reforming hydrocarbon feed converts 50 of 100 mols of this material to other compounds and a partially deactivated catalyst of the same or other type converts only 40 mols per 100 mols of feed then the activity of the fresh catalyst is 50 and the deactivated catalyst is 40. Taking fresh catalyst as a base and considering the relative activity of the fresh catalyst as 1.0, then the relative activity of the partially deactivated catalyst would be 40 divided by 50 times 1 or 0.8. It is apparent, therefore, that the term relative activity may be and is a measure of the effectiveness of a catalyst.

The catalysts which promote the reformnig reactions are also very effective for carrying out the isomerization of normal paraffins in the presence of hydrogen. Fortunately these catalysts are not only efficacious in the fresh or highly active state, but they also produce excellent results even after extended reforming use and numerous regenerations have reduced them to a lower level of activity.

In its broad aspect the invention is not restricted, however, to isomerization catalysts which are also useful for reforming but is intended to embrace the use of other solid catalysts which promote isomerization of hydrocarbons in the presence of hydrogen.

In carrying out a reforming operation the temperatures employed preferably lie in a range between about 750 and about 1100° F. Both the type of products desired and the type and activity of the catalyst used influence the temperature selected. For example, if a product rich in aromatics is desired high temperatures are preferred. Also the same product yield may be obtained with an active catalyst at a relatively low temperature, that requires a substantially higher temperature with a less active catalyst. Illustrating this, it is common practice in commercial operation to increase the operating temperature as the catalyst activity decreases during a run. As a result the average reforming temperature is often above 850° F. The reforming pressure may be varied over a wide range from as low as about 50 p.s.i.g. to about 1200 p.s.i.g., however, usually a pressure of about 100 to 750 p.s.i.g. or higher is preferred. The space velocity varies between about 0.2 and about 40 pounds of hydrocarbon per hour per pound of catalyst and the concentration of hydrogen in the reaction zone is maintained between about 0.5 and about 15 mols of hydrogen per mol of hydrocarbon.

Because of the sensitivity of the reforming catalyst, particularly the platinum and palladium catalysts, to poisoning with sulfur and sulfur compounds, it is usually desirable to desulfurize the hydrocarbon feed before reforming. This is accomplished in one conventional process by contacting the hydrocarbon mixture with a catalyst in the presence of hydrocarbon whereby the sulfur is converted to hydrogen sulfide. The preferred catalyst is the so-called cobalt molybdate type which comprises mixtures of the oxides of cobalt and molybdenum or chemical compounds of cobalt, molybdenum and oxygen or mixtures of one or both oxides with said compounds, either alone or incorporated with a support, for example, alumina. The operating conditions under which desulfurization is carried out may vary widely, however, it is usually preferred to operate in a pressure range of between about 50 and about 1000 p.s.i.g., at a temperature of between about 500 and about 900° F., at a space velocity between about 1.0 and about 15 pounds of hydrocarbon per hour per pound of catalyst and with a hydrogen concentration of between about 200 and about 2000 cubic feet per barrel of hydrocarbon feed.

The isomerization of low boiling straight-chain paraffins is preferably carried out at a temperature between about 750° F. and about 850° F. Temperatures as low as 600° F. and as high as 950° F. may be used, however, the reaction rate is quite low at the lower temperature and at temperatures above 850 undesirable side reactions accompanied by carbon deposition take place. To initiate the reaction and provide a vaporized feed the reactants are preheated, preferably to about the reaction zone temperature. The reaction pressure may be varied over a wide range, however, more usually a pressure of between about 150 p.s.i.g. and about 500 p.s.i.g. is maintained in the reaction zone. It is generally desirable to operate at a space velocity between about 0.5 and about 5 pounds of hydrocarbon per hour per pound of catalyst. Operation in the lower portion of this range is preferred inasmuch as the degree of conversion decreases with increasing space velocity. The hydrogen to hydrocarbon ratio is maintained between about 0.5 and about 3 mols per mol which is somewhat less than is required in the reforming reaction. This is probably due at least in part to the fact that the isomerization reaction is carried out at a lower average temperature than the reforming reaction. The conversion rate is inversely proportional to the hydrogen to hydrocarbon ratio and for this reason it is preferred to maintain the hydrogen concentration at a minimum. There does not appear to be any upper limit to the hydrogen to hydrocarbon ratio which may be used, however, extended operation at ratios below 0.7 lowers the activity of the catalyst substantially. Also operation over lengthy periods at temperatures above about 850° F. causes catalyst contamination from carbonaceous materials due to cracking. On the whole, by controlling the operating conditions within the general ranges given it is possible to isomerize for extended periods of time without regenerating or replacing the catalyst.

In carrying out the combination reforming and isomerization process, a reforming feed material is depentanized, heated to a temperature of about 780° F. and passed through a catalytic desulfurization step in the presence of hydrogen. The desulfurized material is then passed into a reactor containing a reforming catalyst where the conversion to higher octane compounds is carried out, also in the presence of hydrogen. The catalytic reaction may take place in a conventional fluid bed of the moving or fixed type or it may be carried out in a conventional non-fluid bed, also either fixed or moving. When chromium, molybdenum or tungsten catalysts or heteropoly acids or other solid catalysts are used the former type of bed is preferred. On the other hand, when platinum or palladium catalysts are used, the non-fluid bed, usually of the fixed type, is preferred in order to minimize attrition losses of these highly expensive catalysts. In a nonfluid fixed bed operation the catalyst is disposed in one or more beds arranged serially and/or in parallel, the catalyst being either in the form of lumps, granules, powder, etc., or in the form of pellets or other molded shapes. If the fluid type of bed is utilized it is provided in a conventional manner by passing a gasiform medium through a finely divided catalyst at a sufficient velocity to maintain a highly turbulent dense phase bed.

The material leaving the reactor is passed through further processing steps, including the removal of hydrogen and low boiling hydrocarbons, and provides a valuable material for blending in gasoline.

The pentanes and any heavier hydrocarbons separated from the reforming feed are processed to provide substantially pure pentane which is preheated and passed through a reactor containing an isomerization catalyst. Hydrogen separated from the reformer reactor effluent is combined with the pentane feed prior to its admission to the isomerization chamber. Depending on the type of catalyst the reaction here may also be carried out either in a fluid or non-fluid bed. While, normally, a catalyst similar to that used in the reforming reaction is used to promote isomerization it is within the scope of the invention to utilize any of the catalysts of the types previously discussed and either in a fresh or used state.

Hydrogen is separated from the material leaving the isomerization reactor and is returned to the reforming section for use in the desulfurization step. The isomerization effluent is debutanized and is combined with the fresh reformer feed.

The isopentane prepared in this process is normally combined with the reformate produced in the reforming step, however, if desired this material may be yielded as a separate product for other disposition.

Desulfurization of the reformer feed is customary, particularly when the reforming reactions are carried out in the presence of platinum and palladium catalysts. However, if a hydrocarbon fraction sufficiently low in sulfur is utilized as feed to the reformer or if a conventional feed is used in conjunction with a chromium or molybdenum tungsten catalyst, these being more resistive to sulfur poisoning, it is possible to operate the combination process without the desulfurization step.

In such an operation the hydrogen from the isomerization zone is vented from the system instead of being reused in the desulfurization step.

The reforming operation contemplated in this operation is carried out without a net consumption of hydrogen. Since the isomerization of normal pentane consumes little or no hydrogen the combination unit is self-sustaining in this respect and no outside hydrogen is required after the process is under way. It is the rule rather than the exception for reforming to provide a net production of hydrogen. Thus in carrying out this invention, there will normally result an excess of hydrogen which is frequently used in treating heavier materials of high sulfur content such as distillates, gas oils, catalytic cracking charge stocks, residual oils, etc. to lower their sulfur content and otherwise to improve their characteristics such as color and stability.

The process method described above by combining two complementary processes provides several important advantages. Already mentioned is the method of utilizing hydrogen produced in reforming to carry out the isomerization step and the further use of the same hydrogen for desulfurization. Also previously discussed is the advantage of reacting normal pentane separately so as to eliminate the limitations imposed by thermodynamic equilibrium and thereby provide essentially complete conversion of this material to isopentane. Also discussed hereinbefore is the material advantage of using a similar catalyst and in particular using in the isomerization unit a catalyst which has been used and partially deactivated for reforming.

Another very important advantage not hereinbefore discussed in detail lies in the combination of the debutanized isomerization effluent with the reformer feed prior to the depentanizing step. Although contacting paraffins with an isomerization catalyst in the foregoing manner provides excellent yields of high octane isoparaffins the desired products are frequently accompanied by the formation of undesirable by-product compounds both lighter and heavier than the isoparaffins. The lighter compounds are conventionally separated for further processing or for use as a fuel gas. The heavier by-product materials instead of being discarded are advantageously combined with the reformer feed, whereby they are separated with the material which is sent to the desulfurizer and ultimately to the reformer. In the reformer these compounds are converted into a more valuable high octane product.

This method of operation provides a maximum conversion of the lighter paraffinic compounds in the reforming feed to desirable gasoline components and at the same time allows a flexible isomerization operation since undesirable by-products from this latter process need not be discarded, but are also converted to gasoline components. All of this is made possible through the use of the proposed combination process, a process which is enhanced in an economic sense through this and the other advantages previously discussed.

Still another feature not previously discussed which will be considered in more detail in the specific illustration to follow consists of the use of reformer feed as a lean oil in the absorption of hydrocarbons from the hydrogen effluent from the isomerization zone.

In order to more clearly describe the invention and provide a better understanding thereof reference is had to the accompanying drawing which is a diagrammatic illustration exempliflying a specific embodiment of the invention. Referring to the drawing, a hydrocarbon oil suitable for reforming having an ASTM distillation range from about 125° F. to about 400° F. passes through conduit 2 and a steam preheater 4 and is introduced into a depentanizer tower 6. Normal and isopentane and any lower boiling hydrocarbons pass overhead from the tower through conduit 8 through a conventional water condenser 10 and into a reflux accumulator 12. A portion of the condensed material passes through pump 14 and is returned to the tower through conduit 16 as reflux. The remainder of the overhead flows through conduit 18 into a deisopentanizer. The heat required for this separation step is supplied by a conventional reboiler 20. The tower bottoms comprising depentanized material are split into two portions with the major portion being passed through conduit 68 to the reformer unit and the remainder being pumped by pump 70 through conduit 72 and a conventional water cooler 74 into an absorber 64.

Isopentane which has a lower boiling point than normal pentane passes overhead from the deisopentanizer through conduit 24 and condenser 26 into accumulator 28 from which it is withdrawn by pump 30, with a portion being returned to the tower as reflux through conduit 32 and the remainder being discharged through conduit 34 and water cooler 36 as isopentane yield. The heat requirements of this tower are also supplied by a conventional reboiler 40. The tower bottoms, essentially pure normal pentane, leave the tower through conduit 42, pass through pump 44 and thence through heat exchanger 46 where heat is picked up by indirect heat exchange with the isomerization reactor effluent. The warm material flows through preheat furnace 48 where it is vaporized and heated to a temperature of about 800° F. Upon leaving the preheater the normal pentane is combined with hydrogen introduced from conduit 100 in an amount sufficient to provide a hydrogen to hydrocarbon ratio of about 1.5 mols per mol and the mixture passes through conduit 50 into the isomerization reactor 52.

Within the reactor there is maintained a bed of granular catalyst material comprising about 0.6 weight percent platinum on alumina previously used and regenerated several times as a reforming catalyst. The reactor is maintained at a pressure of about 300 pounds p.s.i.g., and the flow rate therethrough is controlled to give a space velocity of about 2 pounds of hydrocarbon per hour per pound of catalyst.

The gaseous effluent from the isomerization reactor comprising a mixture of isopentane, normal pentane and lower and higher boiling hydrocarbons passes from conduit 54 through heat exchanger 56 where heat is given up to incoming hydrogen, through heat exchanger 46 where normal pentane feed is preheated and through a conventional water condenser 58 where still further heat is removed before this material enters an accumulator 60. The accumulator is vented through conduit 62 to absorber 64. Essentially all of the hydrogen present in the reactor effluent passes into this absorber and overhead through conduit 66 for passage to the desulfurizer. Hydrocarbon materials present in the hydrogen are absorbed therefrom in the absorber by bottoms from the depentanizer 6. Liquid passes from the bottom of the absorber through conduit 76, is combined with reactor effluent from accumulator 60 through conduit 78 and the combined stream passes through a steam preheater 80 into a debutanizer tower.

Conditions are maintained within this tower to provide for the removal of butane and lower boiling compounds overhead from the tower. These materials pass through conduit 84, water condenser 86 and into accumulator 88. A quantity of gaseous material equivalent to the butane and the lighter hydrocarbons in the feed is withdrawn from the accumulator through conduit 90 and is yielded as fuel gas. Top tower temperature control is provided by returning the total liquid from the accumulator through pump 92 and conduit 94 to the top of the tower. A conventional reboiler 96 supplies the heat requirements for the separation in this tower. Bottoms from the debutanizer comprising isopentane, unconverted normal pentane and heavier hydrocarbons are combined with the feed material entering preheater 4 through conduit 98. In this manner the heavier hydrocarbons are separated with the reformer feed and are eventually converted to higher octane compounds.

As previously noted, depentanized feed for use in the reforming operation is provided from the bottom of the depentanizer 6. Material passing therefrom flows through conduit 68 and pump 102 and is combined with hydrogen from the absorber 64 through conduit 66. The mixture is preheated in exchanger 104 by indirect heat exchange with desulfurizer effluent and is passed into the desulfurizer 106 where it contacts a catalyst comprising about 3 weight percent cobalt oxide plus about 14 weight percent molybdenum trioxide supported on alumina. In the resulting reactions, the sulfur in the depentanized feed is converted to hydrogen sulfide which is easily removable as a gas. To effect conversion of the sulfur the desulfurizer is operated at a temperature of about 750° F. and is maintained under a pressure of about 180 p.s.i.g. The hydrocarbon flow is controlled to provide a space velocity of about 4 pounds of hydrocarbon per hour per pound of catalyst and sufficient hydrogen is admitted to the desulfurizer to provide a concentration therein of about 800 cubic feet of hydrogen per barrel of oil.

Desulfurized feed exits from the desulfurizer through conduit 108, is partially condensed in exchanger 104 and is further condensed and cooled in a water cooler 110 from which it is passed into accumulator 112. Hydrogen contaminated with hydrogen sulfide is discarded from this accumulator through conduit 113. Liquid feed is removed from the accumulator by pump 114, is discharged through conduit 116, passes through heat exchanger 118 where it absorbs heat from the reforming reactor effluent, is combined with hydrogen from conduit 162 in an amount to provide a mol hydrogen to hydrocarbon ratio of about 6:1 and the mixture is passed through a furnace 117 in which it is vaporized and raised in temperature to about 900° F. and thence into the reformer reactor. Within the reactor there is disposed a bed of granular catalyst similar to that used in the isomerization reactor, that is, about 0.6% platinum on alumina. The reactor pressure is maintained at about 300 p.s.i.g. and the flow rate through the reactor is controlled to give a space velocity of about 2 pounds of hydrocarbon per hour per pound of catalyst.

Effluent leaves the reactor through conduit 122, passes through heat exchangers 124, 118 and 126 where hydrogen, desulfurized feed and hydrogen respectively are preheated and then to water condenser 128 and finally to accumulator 130. Hydrogen is vented from the accumulator through conduit 158 to compressor 160 where it is compressed, with the major portion being returned to the reformer reactor through conduit 162 and heat exchangers 126 and 124 and the remainder being returned to the isomerization unit through conduit 100. Accumulator liquid is passed through pump 132, conduit 134 and exchanger 136 into a depropanizer 150 where propane and lower boiling materials are separated therefrom. The overhead from the tower passes through conduit 138, water condenser 140 and into accumulator 142. Excess light material is vented from the accumulator through conduit 144 as fuel gas and the accumulator liquid is refluxed to the tower through pump 146 and conduit 148. The heat requirements of the tower are supplied by a conventional reboiler 152. The tower bottoms comprising depropanized reformate are passed therefrom through conduit 154, through heat exchanger 136 where heat is given up to the tower feed, through water cooler 156 and thence from the unit as product.

Regeneration zones are not shown in the isomerization or reforming sections. If desired, regeneration may be incorporated in either or both processes, however, it is not anticipated that regeneration of the catalyst utilized in isomerization will be required because of the mildness of the treatment and because of the probable excess of used catalyst available from the reforming section.

It is not intended that the invention be restricted in scope by this specific application thereof. Other types of catalysts, catalyst arrangements, flow schemes, etc., previously discussed or well-known to those skilled in the art are also contemplated for use with similar results. For example, the process may be used for the isomerization of butane and hexane as illustrated below. Also it may be desirable, particularly in starting up a combined unit to recycle hydrogen from the isomerization reaction zone to the reformer reaction zone, thus providing a circulating hydrogen stream. Where a desulfurization step is not included the absorber 64 may be omitted and the hydrogen vented from the debutanizer 82.

A typical application of this invention on a commercial scale is illustrated by the following data.

*Example*

| Flows | | lb./hr. |
|---|---|---|
| Fresh Depentanizer Feed | 77.0° API | 87,700 |
| Absorber Feed | 66.5° API | 6,200 |
| Total Depentanizer Feed | 81.1° API | 126,000 |
| Deisopentanizer Feed | 5.19 lb./gal | 63,400 |
| Debutanizer Feed | 5.23 lb./gal | 41,700 |
| Reactor Feed | 5.23 lb./gal | 33,000 |
| Hydrogen-rich gas to reactor | 11.4 MW [1] | 6,900 |
| Isopentane Product | 5.15 lb./gal | 30,400 |
| Debutanizer Net Overhead | 47.1 MW [1] | 3,500 |
| Desulfurizer Feed | 66.5° API | 56,400 |
| Hydrogen-rich gas to absorber | 14.4 MW [1] | 8,900 |
| Hydrogen-rich gas to desulfurizer | 7.9 MW [1] | 4,400 |

[1] Molecular weight.

Temperatures ° F.:
Depentanizer—
    Feed _____ 185
    Top _____ 136
    Bottom _____ 240
Deisopentanizer—
    Top _____ 132
    Bottom _____ 166
Absorber—
    Feed (liquid) _____ 100
    Feed (gas) _____ 100
    Top _____ 110
    Bottom _____ 105
Debutanizer—
    Feed _____ 190
    Top _____ 145
    Bottom _____ 220
Preheat furnace—
    In _____ 465
    Out _____ 780
Reactor—Out _____ 780
Pressures, p.s.i.g.:
    Depentanizer _____ 20
    Deisopentanizer _____ 30
    Absorber _____ 200
    Debutanizer _____ 80
    Reactor _____ 215

Catalyst: Granular—0.6 weight percent platinum on alumina previously used as a reforming catalyst. Disposed in a vertical cylinder reactor in a bed 8 feet in diameter x 25 feet in length.

Weight space velocity 0.5# of oil/hour/pound of catalyst.

The following data is supplied to illustrate the advantageous results obtained by the use of this process for butane, pentane and hexane isomerization.

The catalyst used in the butane, pentane and hexane isomerization tests was 0.6% platinum on alumina and had been regenerated a number of times. As a result it was partially deactivated as a reforming catalyst. Tabulated data was obtained from runs made in a 250 cc. isothermal test unit.

Butane isomerization [1]

| Run | 1 | 2 | 3 |
|---|---|---|---|
| Pressure, p.s.i.g. | 200 | 150 | 150 |
| Temperature, °F. | 750 | 900 | 925 |
| Space Velocity, lb./hr./lb. | 0.43 | 2.03 | 1.73 |
| $H_2$/Hydrocarbon, Mols/Mol | 1.01 | 0.85 | 0.83 |
| Conversion, Percent | 33.1 | 41.2 | 45.4 |
| Yields: | | | |
| $C_1$–$C_3$ | 2.4 | 11.0 | 14.6 |
| n-$C_4$ | 66.9 | 59.8 | 54.6 |
| i-$C_4$ | 6.8 | 25.4 | 28.3 |
| $C_4$= | 0.0 | 3.2 | 1.9 |
| n-$C_5$ | 12.5 | 0.6 | 0.6 |
| i-$C_5$ | 12.4 | 0.6 | 0.6 |
| Other $C_5$ | 1.0 | 0.6 | 0.6 |

[1] Feed composition: 99% N-butane and 1% iso-butane.

As indicated by the data in the above table rather high temperatures are necessary in order to obtain appreciable conversion of normal butane to isobutane. Unfortunately increasing the reaction temperature also increases production of the $C_1$–$C_3$ fraction which amounts to approximately 15 percent of the feed at 925° F.

does show that at the high temperature employed in this run there is a consumption of isopentane either through conversion to $C_1$–$C_4$ or through conversion to normal pentane.

Hexane isomerization [1]

| Run | 1 | 2 |
|---|---|---|
| Pressure, p.s.i.g. | 150 | 150 |
| Temperature, °F. | 800 | 800 |
| Space velocity, lb./hr./lb. | 4.1 | 2.1 |
| $H_2$/Hydrocarbon, mols/mol | 0.68 | 0.75 |
| Conversion, percent | 47.8 | 66.9 |
| Yields: | | |
| $C_1$–$C_4$ | 1.8 | 3.2 |
| n-$C_6$ | 52.5 | 33.0 |
| 2-methylpentane | 24.1 | 33.8 |
| 3-methylpentane | 18.7 | 25.7 |
| Naphthenes | 2.5 | 3.3 |
| Aromatics | 0.4 | 1.2 |

[1] Feed composition: 100 normal hexane.

The above two runs show that normal hexane is isomerized to give good yields of methylpentanes at a reac-

Pentane isomerization [1]

| Run | 1 | 2 | 3 | 4 | 5 | 6 | 7 | 8 | 9 | 10 | 11 |
|---|---|---|---|---|---|---|---|---|---|---|---|
| Pressure, p.s.i.g. | 300 | 200 | 200 | 200 | 200 | 150 | 150 | 200 | 200 | 200 | 200 |
| Temperature, °F. | 826 | 850 | 850 | 850 | 850 | 850 | 850 | 600 | 750 | 750 | 900 |
| Space Velocity, lb./hr./lb. | 3.97 | 3.56 | 3.53 | 3.85 | 0.90 | 3.91 | 3.81 | 1.00 | 0.90 | 0.45 | 0.99 |
| $H_2$/Hydrocarbon, Mols/Mol | 0.98 | 0.35 | 0.74 | 3.20 | 2.91 | 0.93 | 0.79 | | 2.91 | 3.18 | 2.07 |
| Conversion, Percent | 44.9 | 54.2 | 48.6 | 31.3 | 16.8 | 51.5 | 59.2 | | 16.8 | 16.9 | 54.2 |
| Yields: | | | | | | | | | | | |
| $C_1$–$C_4$ | 1.0 | 3.4 | 3.3 | 1.6 | 3.1 | 3.0 | 5.2 | | 3.1 | 2.5 | 35.5 |
| n-$C_5$ | 54.7 | 45.5 | 51.1 | 68.3 | 44.5 | 48.2 | 40.5 | 51.5 | 44.5 | 44.3 | 24.0 |
| i-$C_5$ | 42.7 | 45.6 | 42.3 | 29.1 | 47.0 | 46.1 | 50.8 | 40.4 | 47.0 | 48.2 | 35.3 |
| other $C_5$ | 1.3 | 3.6 | 1.8 | 0.7 | 1.6 | 1.6 | 2.2 | 2.0 | 1.6 | 1.6 | 3.1 |
| $C_6$+ | 0.3 | 2.0 | 1.6 | 0.3 | 4.0 | 1.2 | 1.4 | 3.9 | 4.0 | 3.4 | 2.6 |

[1] Feed for runs 1 to 7 inclusive: 99.3% n-pentane, 0.5% isopentane and 0.2% cyclopentane. Feed for runs 8 to 11 inclusive: 52.9% normal pentane, 40.9% isopentane, 1.6% cyclopentane and 4.6% hexane.

A consideration of the data from the above table indicates that good conversions of normal pentane to isopentane can be obtained within the range of operating conditions comprising a temperature of about 750° F. to about 850° F., a pressure between about 150 and about 300 p.s.i.g., a space velocity between about 0.5 and about 4.0 pounds of hydrocarbon per hour per pound of catalyst and a hydrogen to hydrocarbon ratio between about 0.7 and about 3.3 mols per mol.

Temperature has a large effect on normal pentane conversion to isopentane, less effect on the production of hexane and pentane by-products and very little effect (below 850° F.) on the yield of $C_1$–$C_4$. In the process temperature range of about 800° F. to about 850° F. which appears most promising the side reactions are small provided that the normal pentane conversion is less than 60 weight percent.

Some evidence of catalyst deactivation for isomerization was noted during the experiments which provide the above data. The limits of operability of this process are difficult to adequately define, however, the combination of temperatures substantially higher than 800° F., hydrogen to hydrocarbon ratios less than 0.7 and low pressure (150 p.s.i.g.) produced a substantially (35%) loss in activity, which was restored by regeneration. Catalyst activity appears to be particularly sensitive to the hydrogen concentration, therefore, although conversion of the feed to isopentane is increased as the amount of hydrogen in the feed is decreased, operation below a hydrogen to hydrocarbon ratio of about 0.7 does not seem desirable.

Pressure in the range of 150 to 300 p.s.i.g. appears to have little or no effect on conversion.

The effect of thermodynamic equilibrium on the isomerization reaction as discussed previously is illustrated by run 11 which was made with a mixed feed containing a large percentage of isopentane. Although the data given does not indicate the approach to equilibrium it tion temperature of 800° F. As would be expected decreasing the space velocity substantially increases the production of methylpentane.

Having thus described the invention by reference to a specific application thereof, it is understood that no undue limitations or restrictions are to be imposed by reason thereof but that the scope of the invention is defined by the appended claims.

We claim:

1. A combination catalytic reforming and catalytic isomerization process which comprises separating a light hydrocarbon oil rich in normal paraffins in a first separation zone from a hydrocarbon feed suitable for reforming, effecting a further separation of a stream rich in isoparaffins from said light hydrocarbon oil in a second separation zone, contacting the normal paraffin-rich oil from the second separation zone in a first reaction zone with a solid isomerization catalyst in the presence of hydrogen under conditions suitable to effect isomerization of the normal paraffins, separating a hydrogen rich stream from the isomerization zone effluent, passing the separated hydrogen rich stream containing unreacted normal paraffins, product isomers, lower and higher boiling products and hydrogen to a third separation zone wherein lower boiling products and hydrogen are removed, passing the thus separated hydrogen to a desulfurization zone passing isomerization effluent substantially free of hydrogen with the feed to the first separation zone, passing the heavy fraction from the first separation zone to a second reaction zone wherein it is contacted with a desulfurization catalyst in the presence of hydrogen separated from said isomerization effluent under conditions suitable to effect desulfurization of said heavy fraction, contacting the desulfurized material in a third reaction zone with a reforming catalyst in the presence of hydrogen under conditions suitable to produce a conversion product containing hydrogen, separating hydrogen from the reforming zone effluent and passing hydrogen separated from the reforming effluent to said isomerization zone.

2. The process of claim 1 in which the normal paraffin-rich oil contains at least one normal paraffin selected from the group consisting of normal pentane and normal hexane.

3. A process which comprises separating a light hydrocarbon oil rich in normal paraffins in a first separation zone from a hydrocarbon feed suitable for reforming, effecting a further separation of a stream rich in isoparaffins from said normal paraffin rich stream in a second separation zone, contacting the normal paraffin-rich oil from the second separation zone in a first reaction zone in the presence of hydrogen with an isomerization catalyst comprising a catalyst previously used for reforming hydrocarbons under conditions suitable to effect isomerization of the normal paraffins, separating a hydrogen rich stream from the isomerization effluent, passing the separated hydrogen rich stream containing unreacted normal paraffins, product isomers, lower and higher boiling products and hydrogen to a third separation zone wherein lower boiling products and hydrogen are removed, passing unreacted normal paraffins and product isomers separated from the hydrogen rich stream and the remainder of the isomerization effluent with the feed to the first separation zone, passing the heavy fraction from the first separation zone to a second reaction zone wherein it is contacted with a desulfurization catalyst in the presence of hydrogen separated from the isomerization effluent under conditions suitable to effect desulfurization of said heavy fraction, contacting the desulfurized material in a third reaction zone with a reforming catalyst in the presence of hydrogen under conditions suitable to produce a conversion product containing hydrogen, separating a hydrogen rich stream from the reforming zone effluent and passing a portion of said stream to said first reaction zone to provide the hydrogen required therein.

4. The process of claim 3 in which the normal paraffin-rich oil contains at least one normal paraffin selected from the group consisting of normal pentane and normal hexane.

5. A combination process which comprises separating a light hydrocarbon oil rich in normal paraffins having not more than 6 carbon atoms in a first separation zone from a heavy hydrocarbon feed fraction suitable for reforming, effecting a further separation of a stream rich in isoparaffins from said light hydrocarbon normal paraffin oil in a second separation zone, contacting the normal paraffin-rich oil from the second separation zone in a first reaction zone with a solid isomerization catalyst in the presence of hydrogen under conditions suitable to effect isomerization of the normal paraffins and produce an isomerization effluent containing compounds having more and less carbon atoms than the compounds present in the feed to the isomerization zone, passing isomerization effluent comprising unreacted normal paraffins, product isomers, lower and higher boiling products and hydrogen to a third separation zone wherein hydrogen is separated from the isomerization effluent, combining isomerization effluent less hydrogen with the feed to the first separation zone, passing the heavy fraction from the first separation zone to a second reaction zone wherein it is contacted with a desulfurizing catalyst in the presence of hydrogen separated from said isomerization effluent under conditions suitable to desulfurize said heavy fraction, passing the desulfurized heavy fraction to a third reaction zone wherein it is contacted with a reforming catalyst in the presence of hydrogen to produce a reformate product containing hydrogen, separating hydrogen from said reformate product and passing the thus separated hydrogen to the first reaction zone to provide the hydrogen required for isomerization.

6. A process for upgrading a naphtha fraction which comprises separating the naphtha fraction into a normal paraffin fraction, an isoparaffin fraction and a high boiling fraction converting said normal paraffin fraction in the presence of hydrogen in an isomerization zone in the presence of a platinum catalyst at a temperature of about 750° to 850° F. to an isomerate product, separating hydrogen from said isomerate product, passing said high boiling fraction to a desulfurizing zone, desulfurizing said high boiling fraction in the presence of hydrogen separated from said isomerate product at a temperature in the range of about 500 to about 900° F., separating a desulfurized high boiling fraction from said desulfurizing zone and passing the same in the presence of hydrogen to the hydroforming zone, converting said desulfurized high boiling fraction in the presence of hydrogen and a platinum catalyst to a hydroformate product, separating hydrogen from said hydroformate product, and passing hydrogen separated from said hydroformate product to said isomerization zone.

7. A process for improving the octane rating of a naphtha fraction contaminated with sulfur compounds which comprises separating said naphtha fraction into a normal paraffinic fraction, an isoparaffin, and a high boiling fraction, desulfurizing said high boiling fraction in the presence of hydrogen in a desulfurizing zone, separating a desulfurized high boiling fraction from said desulfurizing zone and passing the same to a hydroforming zone, converting said desulfurized high boiling fraction in the presence of hydrogen to a hydroformate product in said hydroforming zone, separating hydrogen from said hydroformate product, passing said normal paraffinic fraction to an isomerizing zone, converting said normal paraffin fraction in the presence of hydrogen obtained from said hydroformate product to an isomerate product in said isomerizing zone, separating hydrogen from said isomerate product and passing the same to said desulfurizing zone, and commingling said isoparaffinic fraction with said hydroformate product.

8. A process for upgrading a hydrocarbon fraction which comprises in combination an isomerization zone, a desulfurizing zone and a reforming zone, separating said hydrocarbon fraction into a low boiling fraction containing normal paraffins and a high boiling fraction, desulfurizing said high boiling fraction in the presence of hydrogen in a desulfurizing zone, converting said desulfurized high boiling fraction in the presence of hydrogen to a hydroformate product in a hydroforming zone, separating hydroformate product from said hydroforming zone, separating hydrogen from said hydroformate product, converting said normal paraffinic fraction in the presence of hydrogen obtained from said hydroformate effluent to an isomerate product in an isomerization zone, separating hydrogen from said isomerate product, separating a low boiling fraction from said isomerate product, recycling the remaining portion of said isomerate product to said first separation step and passing hydrogen separated from said isomerate product to said desulfuring zone.

9. An improved process for upgrading a light hydrocarbon oil fraction rich in normal paraffins which comprises separating a steam rich in normal paraffins and a hydrocarbon feed suitable for reforming from said light hydrocarbon oil fraction in a first separation zone, separating an isoparaffin rich stream from said normal paraffin rich stream in a second separation zone, recovering a normal paraffin rich stream from said second separation zone, passing the normal paraffin rich stream recovered from said second separation zone with a hydrogen rich gas stream to an isomerization zone, isomerizing said normal paraffin rich stream in said isomerization zone to produce an isomate product stream containing hydrogen, unreacted normal paraffins and isomers, separating a hydrogen rich stream from said isomate product stream, passing said hydrogen rich stream in contact with a light absorbent oil comprising a portion of said hydrocarbon feed suitable for reforming in an absorption zone, recovering hydrogen from said absorption zone, recovering a rich absorbent oil from said absorption zone and combining the same with the remainder of said isomate product stream, passing isomate product containing rich absorbent oil to said first separation zone, passing a portion of said hydrocarbon feed suitable for reforming with hydrogen separated from said absorption zone to a desulfurization zone, desulfurizing said hydrocarbon feed in said desulfurization zone, recovering desulfurized hydrocarbon feed and passing the same with hydrogen to a reforming zone, converting said desulfurized hydrocarbon feed in said reforming zone under conditions to produce a reformate product containing hydrogen, separating hydrogen from said reformate product, recovering said reformate product and passing separated hydrogen to said isomerization zone and said reforming zone.

10. An improved process for upgrading a light hydrocarbon oil which comprises separating a normal paraffin rich stream and a hydrocarbon feet stream suitable for reforming from said light hydrocarbon oil in a first separation zone, passing hydrocarbon feed suitable for reforming in admixture with hydrogen rich gas stream to a desulfurizing zone, desulfurizing said hydrocarbon feed in said desulfurization zone, recovering a desulfurized hydrocarbon feed from said desulfurization zone and passing the same with the hydrogen rich gas stream to a reforming zone, reforming said desulfurized hydrocarbon feed in said reforming zone under reforming conditions for the net production of hydrogen to produce a reformate product, separating hydrogen from said reformate product and combining a portion of said separated hydrogen with said normal paraffin rich stream, passing said normal paraffin rich stream and hydrogen to an isomerization zone, isomerizing said normal paraffin rich stream in said isomerization zone to product an isomate product containing hydrogen, separating a hydrogen rich stream from said isomate product and passing the same with said hydrocarbon feed passed to said desulfurization zone, recovering the remainder of said isomate product substantially free of hydrogen rich gas and containing unreacted normal paraffins, passing the same to said separation zone to recover normal paraffins therefrom for recycle to said isomerization zone and recovering isomer product of the process.

References Cited in the file of this patent

UNITED STATES PATENTS

| | | |
|---|---|---|
| 1,881,534 | Harding | Oct. 11, 1932 |
| 2,276,171 | Ewell | Mar. 10, 1942 |
| 2,391,962 | Goldsby | Jan. 1, 1946 |
| 2,463,741 | Byrns | Mar. 8, 1949 |
| 2,642,381 | Dickinson | June 16, 1953 |
| 2,651,597 | Corner et al. | Sept. 8, 1953 |
| 2,736,684 | Tarnpoll | Feb. 28, 1956 |
| 2,772,212 | Seyfried | Nov. 27, 1956 |
| 2,792,333 | Porter et al. | May 14, 1957 |

UNITED STATES PATENT OFFICE
CERTIFICATE OF CORRECTION

August 18, 1959

Patent No. 2,900,323

James L. Patton et al

It is hereby certified that error appears in the printed specification of the above numbered patent requiring correction and that the said Letters Patent should read as corrected below.

Column 5, line 36, for "hydrocarbon" read -- hydrogen --; column 8, line 8, for "major portion" read -- major part --; column 10, line 63, for "cylinder" read -- cylindrical --; line 67, for "obtained" read -- obtainable --; column 11, line 62, for "substantially" read -- substantial --; column 14, line 59, for "desulfuring" read -- desulfurizing --; line 63, for "steam" read -- stream --; column 15, line 23, for "feet" read -- feed --; column 16, line 8, for "product", first occurrence, read -- produce --.

Signed and sealed this 19th day of April 1960.

(SEAL)
Attest:

KARL H. AXLINE
Attesting Officer

ROBERT C. WATSON
Commissioner of Patents